W. H. GATES.
RUBBER COATED BELT.

No. 60,713. Patented Jan. 1, 1867.

Witnesses
Jas H McGill
Edw. F Brown.

Inventor.
W H Gates

United States Patent Office.

WILLIAM H. GATES, OF LOUISVILLE, KENTUCKY.

Letters Patent No. 60,713, dated January 1, 1867.

IMPROVED MACHINE BELTING.

The Schedule referred to in these Letters Patent and making part of the same.

TO ALL WHOM IT MAY CONCERN:

Be it known that I, WILLIAM H. GATES, of Louisville, in the county of Jefferson, and State of Kentucky, have invented a new and useful improvement in Machine Belting; and I do hereby declare that the following is a full, clear, and exact description thereof, which will enable others skilled in the art to make and use the same, reference being had to the accompanying drawings, forming a part of this specification, in which—

Similar letters of reference indicate like parts.

Figure 1:
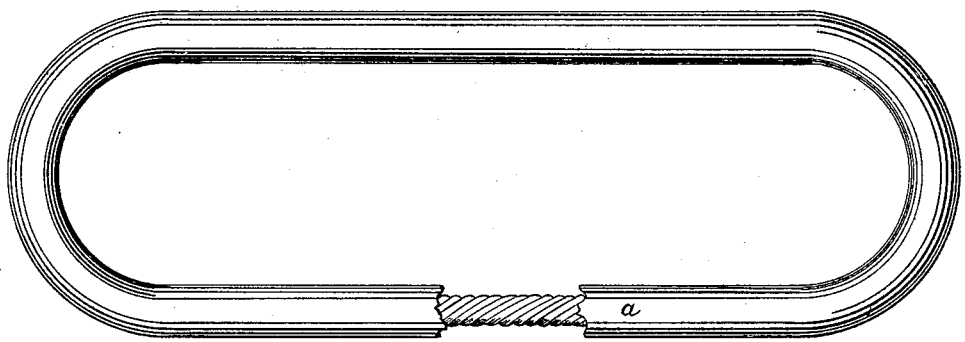
Figure 1 is a view of my rubber or elastic coated belt, as made in the endless form, with a section of the coating $a$ removed to show the construction.
Figure 2:
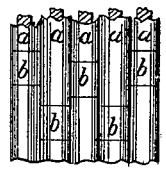
Figure 2 is a section of a combination of round belts as an improved flat belt, showing also the external appearance of the couplings, $b$.

The object of my invention is to furnish an improved round or angular belt, non-elastic in its length, but having an elastic coating or exterior. As in ordinary belting, especially of the round form, that part opposite the pulley is, in operating, subjected to extraordinary strain, while the part within is corrugated, the effect of this elastic coating is to obviate these difficulties. Heretofore, these objections have been overcome partially through a slight elasticity by the form or in the substance of the belt, as in the twisted leather and endless woollen belts, but what has been gained by elasticity has always been lost in friction on the machinery, consequent upon the increased tension necessary to make the belt effective. But as this elastic coating presents a far more adhesive surface to the pulleys, greater power will be attained, of this description, even a slack belt, whereby also the friction on the machinery must of necessity be diminished.

This belt consists of a base of cotton or linen cord, or other fabric, coated with vulcanized rubber or other elastic material. The cord may be made after the manner of the endless belts used on Davis and Kidder's electrical machines, or its ends may present loops, links, or other forms for attachment or detachment at pleasure. When thus prepared, in a cord-like form, it should be coated with Hughes's cement, and again, when nearly dry, with a sheet of the rubber compound as prepared for vulcanizing in the manufacture of soft rubber goods, including packing or the admixture of cotton or other fibre when desirable. This sheet of prepared rubber should be cut into strips corresponding in length with the belt, and of such a width as when wrapped a few times round the cord will constitute about one-third or one-half the diameter of the belt. If the cord is endless, the strips for coating should be placed around a drum whose circumference corresponds to the length of the cord and the ends cemented on a bevel, thus making a continuous band evenly started, on the edge of which the cemented cord is now rolled. It is then removed and wrapped in soap-stone or in cloth, to preserve its form, and vulcanized. By similar cementing process, if desired, elastic coated belts may be made on a flat base, with three or more various angles; if three, the base being one; but the combination of two or more round belts on the same pulleys with surfaces grooved to receive them, will doubtless supersede other forms. The elastic coated belt may be coupled through a section of rubber tubing, thus making the connection close and concealed.

What I claim and desire to secure by Letters Patent, is—

1. A round belt composed of a non-elastic central cord coated with vulcanized rubber or other elastic material, substantially as described and for the purpose set forth.

2. I claim the combination of two or more twisted cords coated with or surrounded by a coating of vulcanized rubber or other elastic material to form an improved driving belt for machinery.

3. I claim the process of coating a cotton or other cord as the base of a round belt with vulcanized rubber or other elastic material, substantially as described and for the purpose set forth.

W. H. GATES.

Witnesses:
 JOHN R. EPPLEY,
 W. H. H. GREEN.